United States Patent [19]

Stocco

[11] Patent Number: 5,158,504
[45] Date of Patent: Oct. 27, 1992

[54] FLEXIBLE COUPLING INCLUDING A FLEXIBLE DIAPHRAGM ELEMENT CONTOURED WITH ITS THINNEST THICKNESS NEAR THE CENTER THEREOF

[75] Inventor: Joseph N. Stocco, Utica, N.Y.

[73] Assignee: Lucas Aerospace Power Transmission Corp., Utica, N.Y.

[21] Appl. No.: 351,069

[22] Filed: May 12, 1989

[51] Int. Cl.$^5$ .............................................. F16D 3/79
[52] U.S. Cl. .................................... 464/99; 464/147
[58] Field of Search .......................... 464/98, 99, 147; 192/106.1

[56] References Cited

U.S. PATENT DOCUMENTS

| | | | |
|---|---|---|---|
| 3,124,942 | 3/1964 | Rothfuss et al. | 464/99 |
| 4,092,836 | 6/1978 | Wildhaber | 464/99 X |
| 4,133,188 | 1/1979 | Cartwright | 464/99 |
| 4,265,099 | 5/1981 | Johnson et al. | 464/99 |

FOREIGN PATENT DOCUMENTS

| | | | |
|---|---|---|---|
| 456920 | 8/1944 | Belgium . | |
| 2542946 | 3/1977 | Fed. Rep. of Germany . | |
| 0092071 | 8/1978 | Japan | 464/98 |
| 272052 | 2/1951 | Switzerland . | |

OTHER PUBLICATIONS

Joseph Edward Shigley, Larry D. Mitchell, *Mechanical Engineering Design* 4th Edition, 1983, McGraw-Hill, p. 810, 811, 839.

Primary Examiner—Daniel P. Stodola
Assistant Examiner—William G. Battista, Jr.
Attorney, Agent, or Firm—Anthony F. Cuoco

[57] ABSTRACT

A flexible coupling has at least one and more commonly a plurality of diaphragms having a particular profile. The profile has first and second contoured sections. The first contoured section has a radially-inwardly decreasing thickness and extends to near the center of the diaphragm and the second section extends therefrom and has a radially-inwardly increasing thickness such that the bending moment developed by axial deflections is small near the thinnest section or the center of the diaphragm, and the stress levels are minimized throughout the diaphragm. The diaphragm profile as described is analytically optimized to tolerate greater axial deflection and bending before the fatigue and endurance limits of the diaphragm material are reached than has heretofore been the case.

9 Claims, 1 Drawing Sheet

FLEXIBLE COUPLING INCLUDING A FLEXIBLE DIAPHRAGM ELEMENT CONTOURED WITH ITS THINNEST THICKNESS NEAR THE CENTER THEREOF

BACKGROUND OF THE INVENTION

This invention relates generally to couplings for connecting two shafts which are misaligned and more particularly to a flexible coupling for the purposes described including thin, contoured, flexible diaphragm means.

Flexible couplings for connecting two shafts such as a driving shaft and a driven shaft, which transmit torque while accommodating axial extension and angular misalignment of the shafts have long been used in aircraft, industrial and military applications. These couplings use at least one but more commonly a plurality of thin, contoured diaphragms welded or otherwise secured together to form the coupling which is mounted to the driving and driven shafts.

Prior art coupling diaphragms have been designed with torque transmission as the primary consideration and flexibility as the secondary consideration. However, there are many applications in which torque transmission requirements are easy to achieve so that the flexibility requirement becomes the prime design factor. The flexibility feature of the diaphragm is incorporated in its profile.

It is well known that torque transmitting capacity varies as the reciprocal of the square of the radius of the diaphragm. For that reason prior art diaphragms have their thinnest section near their rim. However, this generates high stresses in the rim area under axial deflection or bending conditions. The present invention features a particular diaphragm profile which enables the diaphragm to be stretched to accommodate large axial deflections without over-stressing the diaphragm material. In order to accommodate this condition the diaphragm must be thin enough to be flexible at those areas where the diaphragm stress will be low. Further, the profile of the diaphragms must take into account the torque transmission requirements for the flexible coupling arrangement and the buckling stability of the coupling.

In the present invention the diaphragm profile is analytically optimized so that the bending moment developed by axial deflections is small at the thinnest section of the profile. This insures that stress levels are minimal throughout the diaphragm. Consequently, greater axial deflection and bending can be accommodated before diaphragm material fatigue and endurance limits are reached than has heretofore been the case.

SUMMARY OF THE INVENTION

This invention contemplates a flexible coupling having flexible diaphragm means, including first tubular connector means arranged for being attached to a driving shaft and second tubular connector means arranged for being attached to a driven shaft. The first and second connector means are arranged on a common axis and the flexible diaphragm means is disposed between and connected to the first and second connector means. The flexible diaphragm means includes at least one but more commonly a plurality of thin, flexible, annular diaphragms. Each of said diaphragms has a circumferential rim and a profile or contoured section having first and second portions inwardly thereof. The first portion has a radially-inwardly decreasing thickness and extends to near the center of the diaphragm, and the second portion extends therefrom and has a radially-inwardly increasing thickness such that the bending moment developed by axial deflections is a minimum near the thinnest section, near the center of the diaphragm, and the stress levels are maintained minimal throughout the diaphragm. The diaphragm profile as described is analytically optimized so that greater axial deflection and bending can be accommodated before the fatigue endurance limit of the diaphragm material is reached than has heretofore been the case.

DETAILED DESCRIPTION OF THE INVENTION

Figure 1:
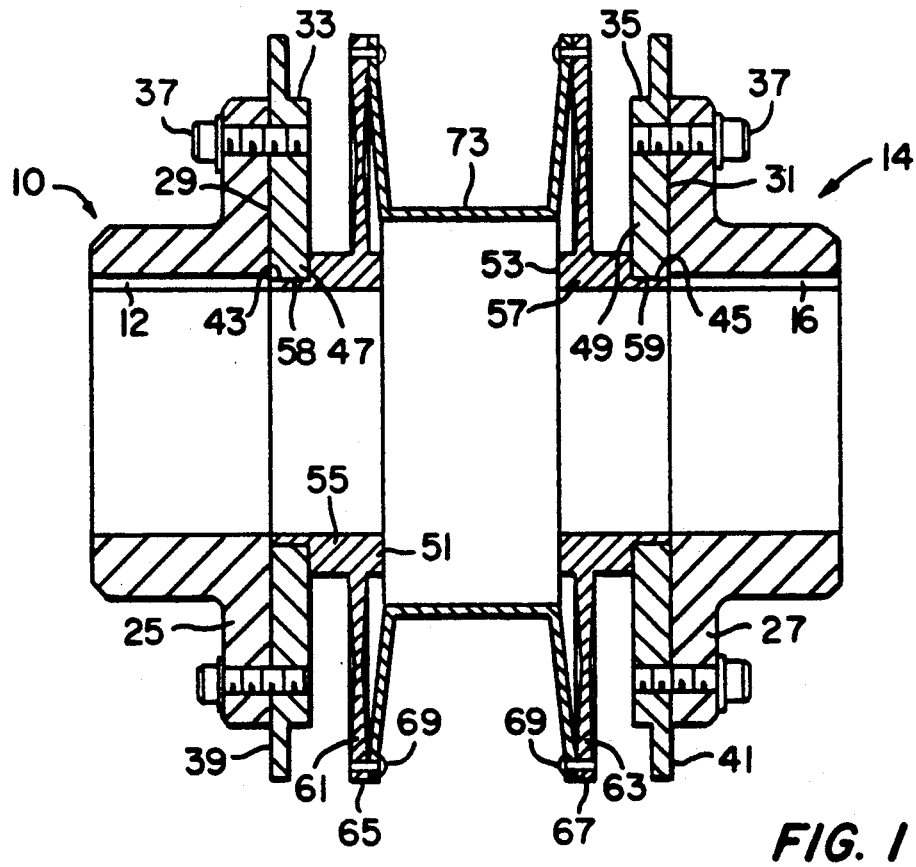
FIG. 1 is a longitudinal sectional view of a flexible coupling including contoured diaphragms having first and second sections according to the invention.

With reference to FIG. 1, a left tubular connector 10 has a keyway 12 for connecting the coupling of the invention to a drive shaft. At the right end another identical connector 14 also has a keyway 16 for connecting the coupling to another shaft which can be a driven shaft relative to the drive shaft attached to connector 10, or the arrangement can obviously be reversed. Neither the drive or driven shafts are otherwise shown. In any event, one shaft has or assumes during the transmission of torque a particular misalignment in relation to the other shaft.

Connectors 10 and 14 are arranged on a common axis in axially spaced relation and have means therebetween which will accommodate the aforenoted misalignment. Each connector 10 and 14 has radially-outwardly extending flanges 25 and 27 which face each other. These heavy rigid flanges 25 and 27 have flat traverse or radially facing surfaces 29 and 31, respectively. Abutting surfaces 29 and 31 are two thick support rings 33 and 35, respectively, attached, for example, by bolts 37 to left and right connectors 10 and 14. Support rings 33 and 35, respectively, have annular radially-outwardly projecting guard extensions 39 and 41. The flat sided rigid rings 33 and 35 have an axial thickness such that extended annular mounting surfaces 43 and 45 are provided. The transverse radially-inner parts of both rings, together with the axially extending surfaces 43 and 45, form right-angled mounting corners 47 and 49 at the axially-inward sides of the rings.

Two flexible discs or diaphragms 51 and 53, respectively, have at the radially-inner part thereof, integral tubular attachment sections 55 and 57 with right angle ledges 58 and 59 which respectively abut the surfaces of the right angled mounting corners 47 and 49 of the left and right support rings 33 and 35.

Suitable brazes or welds or the like rigidly bond the annular diaphragms 51 and 53 at their ledge surfaces to support rings 33 and 35 so that bending is prevented and a rigid, strong attachment is assured. It is apparent that the right-angle corner arrangements having extended bonding surfaces will prevent forces from bending the diaphragm tubular attachment sections 55 and 57 inwardly or outwardly. The flexible diaphragms 51 and 53 further have contoured or profiled radially extending sections 61 and 63 on either side thereof, and merging outwardly thereof rigid rim sections or circumferential flanges 65 and 67 of uniform thickness. The arrangement so far shown and described, except for the profile of diaphragms 51 and 53, is shown and described in U.S. Pat. No. 3,124,942 issued to Rothfuss, et al on Mar. 17, 1964. A similar arrangement, again except for the diaphragm profile, is described in U.S. Pat. No. 4,133,188 issued to Cartwright on Jan. 9, 1979. While only two diaphragms are shown it will be understood that the coupling described may have only a single such diaphragm or more commonly, a plurality of diaphragms, as the case may be.

In the aforenoted U.S. Pat. Nos. 3,124,942 and 4,133,188 the flexible diaphragms have contoured or profiled radially-extending sections whereby each of said diaphragms has a contoured section extending inwardly from the circumferential flange, with said contoured section having a radially-outwardly decreasing thickness as particularly shown in FIG. 2.

Figure 2:
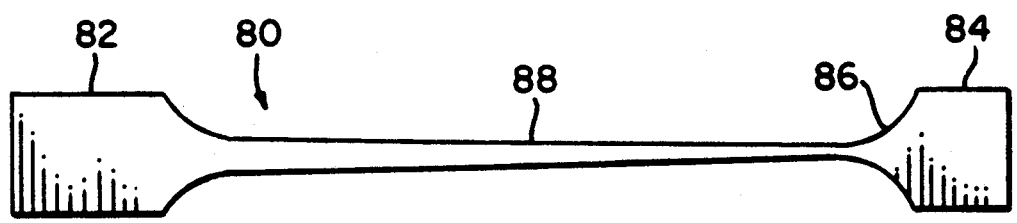
FIG. 2 is a diagrammatic representation showing a half-profile of a prior art diaphragm, the other half-profile being the same.

With particular reference to FIG. 2, which shows the profile of a prior art diaphragm, said diaphragm is designated generally by the numeral 80 and includes an attachment section 82 and a circumferential flange or rim section 84 as heretofore described with reference to FIG. 1. Since torque carrying capacity varies as the reciprocal of the square of the radius of the diaphragm, the prior art diaphragm profiles have their thinnest section 86 near circumferential rim section 84. It will be readily understood that this configuration generates large bending stresses in the circumferential rim section under axial deflection or bending conditions. To put it another way, with the prior art diaphragm profile as shown in FIG. 2 the stress distribution from torque is given the greatest priority. The diaphragm profile is designed to keep the torque carrying stress nearly uniform throughout the radius of the diaphragm. Accordingly, the prior art diaphragms are such that the diaphragms have a contoured radially-outwardly extending section of decreasing thickness. That is to say, contoured section 88 has a single radially-outwardly decreasing taper such that substantially uniform bending and torsional stress results.

Figure 3:
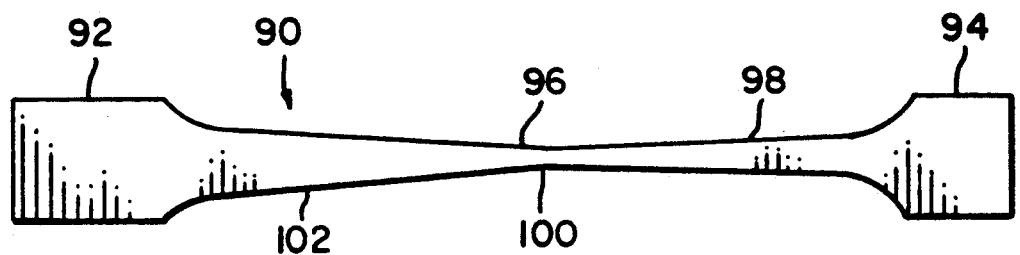
FIG. 3 is a diagrammatic representation showing a half-profile of a diaphragm in accordance with the invention, the other half-profile being the same.

With reference to FIG. 3, a diaphragm according to the present invention is designated by the numeral 90. Diaphragm 90 has an attachment section 92 and a circumferential rim section 94. A contoured section 96 extends inwardly from circumferential rim section 94 to attachment section 92. Contoured section 96 includes a first portion 98 extending or tapering from rim section 94 with a radially-inwardly decreasing thickness to near the center 100 of diaphragm 96, and therefrom a second portion 102 extending or tapering with a radially-inwardly increasing thickness to attachment section 92.

With the diaphragm profile as shown in FIG. 3, the bending moment developed by deflections is minimum at the thinnest section of the profile or near the center of the diaphragm and stress levels are kept minimal throughout the diaphragm. Consequently, greater axial deflection or bending can be accommodated by such profiles before the fatigue endurance limit of the diaphragm material is reached than has heretofore been the case. Thus, the diaphragm profiles are analytically optimized to provide the aforementioned characteristics. This optimization includes determining the particular location and the thickness of the profile near the center of the diaphragm, the inner and outer radii of the diaphragm and the ratio of thickness at the inner and outer radii.

The dual-taper arrangement shown in FIG. 3 provides an added benefit in that the stress rise in going from the diaphragm circumferential rim to attachment sections is minimal. Further, the inwardly decreasing taper of portion 98 is less than the inwardly increasing taper of portion 102 so that the stress at attachment section 92 is the same as the stress at circumferential rim section 94, as will now be discerned.

It will be seen from the aforegoing description of the invention that a coupling including highly flexible diaphragm means has been disclosed. The invention considers a dual taper diaphragm configuration or profile which is analytically optimized to render the diaphragm capable of being stretched to accommodate large axial deflections without overstressing the diaphragm material. In order to accommodate these criteria the diaphragms are thin enough to be flexible at those locations where the stress in the diaphragm is low. Moreover, the torque transmission requirements for the coupling and the buckling stability thereof have been considered.

With the aforegoing description of the invention in mind reference is made to the claims appended hereto for a definition of the scope of the invention.

What is claimed is:

1. A flexible coupling, comprising:
   at least one diaphragm element;
   said diaphragm element being analytically optimized to include a contoured section having first and second portions, a circumferential rim section and an attachment section;
   the first portion of the contoured section merging with the circumferential rim section and having a radially-inwardly decreasing thickness, and extending to near the center of the diaphragm element; and
   the second portion of the contoured section merging with the first portion thereof near the center of the diaphragm element and having a radially-inwardly increasing thickness, and extending to the attachment section and merging therewith.

2. A flexible coupling as described by claim 1, wherein:
   the contoured section is thinnest near the center thereof where the first and second portions merge such that the bending moments developed by axial deflections are minimal thereat and torsional stresses are below the fatigue and endurance limits of the diaphragm element material throughout the diaphragm element.

3. A flexible coupling as described by claim 1, wherein:
   the radially-inwardly decreasing thickness is less than the radially-inwardly increasing thickness so that the bending stresses at the circumferential rim and attachment sections are equal.

4. A flexible coupling, comprising:
   a plurality of annular diaphragm elements arranged in axial spaced relation on a common axis;
   each of said diaphragm elements being analytically optimized to include a contoured section having first and second portions, a circumferential rim section and an attachment section;
   the first portion of the contoured section merging with the circumferential rim section and extending radially-inwardly therefrom with a decreasing taper to near the center of the contoured section; and the second portion of the contoured section merging with the first portion thereof near the center of the contoured section and extending radially-inwardly therefrom with an increasing taper and merging with the attachment section.

5. A flexible coupling as described by claim 4, wherein:

the contoured section is thinnest near the center thereof where the first and second portions merge, whereby bending moments developed by axial deflections being minimal where said contoured section is thinnest, and torsional stresses being below the fatigue and endurance limits of the diaphragm element material throughout the diaphragm element.

6. A flexible coupling as described by claim 4, wherein:

the radially-inwardly decreasing taper is less than the radially-inwardly increasing taper so that the bending stress at the circumferential rim section is equal to the bending stress at the attachment section.

7. A flexing coupling for two rotating shafts which are misaligned, comprising:

first connector means having structure for attaching to a first of the two shafts;

second connector means having structure for attaching to a second of the two shafts;

said first and second connector means being arranged on a common axis;

flexible diaphragm means arranged between and connecting said first and second connector means;

said flexible diaphragm means including a plurality of annular diaphragm elements;

each of said annular diaphragm elements having a circumferential rim and inwardly thereof a contoured section; and said contoured section being analytically optimized to include a first portion having a radially-inwardly decreasing thickness and extending to near the center of the diaphragm element and a second portion extending therefrom and having a radially-inwardly increasing thickness such that the thinnest section of the diaphragm element is near the center thereof, whereby bending moments developed by axial deflections are minimal at said thinnest section, and torsional stresses are maintained below the fatigue and endurance limits of the diaphragm element material throughout the diaphragm element.

8. A flexible coupling for two rotating shafts which are misaligned, comprising:

first connector means having structure for attaching to a first of the two shafts;

second connector means having structure for attaching to a second of the two shafts;

said first and second connector means being arranged on a common axis;

flexible diaphragm means arranged between and connecting said first and second connector means;

said flexible diaphragm means including a plurality of annular diaphragm elements;

each of said annular diaphragm elements having a circumferential rim section and an attachment section, and a contoured section extending radially-inwardly from the circumferential rim section to the attachment section; and said contoured section being analytically optimized to include a first portion having a radially-inwardly decreasing taper and extending from the circumferential rim section to near the center of the diaphragm and a second portion extending therefrom to the attachment section and having a radially-inwardly increasing taper such that the thinnest section of the diaphragm element is near the center thereof, whereby bending moments developed by axial deflections are minimal at said thinnest section, and torsional stresses are below the fatigue and endurance limits of the diaphragm element material throughout the diaphragm element.

9. A flexible coupling as described by claim 8, wherein:

the radially-inwardly decreasing taper is less than the radially-inwardly increasing taper so that the bending stress at the circumferential rim section is the same as the bending stress at the attachment section.

* * * * *